(12) United States Patent
Nagasawa (10) Patent No.: US 12,083,830 B2
(45) Date of Patent: Sep. 10, 2024

(54) TIRE

(71) Applicant: Sumitomo Rubber Industries, Ltd., Hyogo (JP)

(72) Inventor: Koki Nagasawa, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 343 days.

(21) Appl. No.: 16/919,491

(22) Filed: Jul. 2, 2020

(65) Prior Publication Data

US 2021/0031568 A1 Feb. 4, 2021

(30) Foreign Application Priority Data

Jul. 30, 2019 (JP) .................................. 2019-140019

(51) Int. Cl.
*B60C 11/12* (2006.01)
*B60C 11/03* (2006.01)

(52) U.S. Cl.
CPC ...... *B60C 11/1236* (2013.01); *B60C 11/1204* (2013.01); *B60C 2011/0372* (2013.01); *B60C 2011/1245* (2013.01)

(58) Field of Classification Search
CPC ..... B60C 2011/1245; B60C 2011/1213; B60C 11/1204; B60C 11/12
See application file for complete search history.

(56) References Cited

U.S. PATENT DOCUMENTS

| 4,736,783 A * | 4/1988 | Motomura .......... B60C 11/1263 |
| | | 152/209.27 |
| 2017/0057298 A1* | 3/2017 | Li ....................... B60C 11/1272 |
| 2018/0141389 A1* | 5/2018 | Yamaoka ............ B60C 11/1263 |
| 2019/0039418 A1* | 2/2019 | Arai .................... B60C 11/0304 |

FOREIGN PATENT DOCUMENTS

| EP | 3769976 A1 * | 1/2021 | ........ B60C 11/0304 |
| JP | 2019-116197 A | 7/2019 | |

* cited by examiner

*Primary Examiner* — Cedrick S Williams
(74) *Attorney, Agent, or Firm* — Studebaker & Brackett PC (57) ABSTRACT

A tire includes a tread portion including a first land region defined by main grooves. The first land region includes a first longitudinal edge and a second longitudinal edge, and a ground contacting surface defined between the first longitudinal edge and the second longitudinal edge. The first land region is provided with two first grooves and a second groove. Each of the first grooves extends so as to connect the first longitudinal edge and the second longitudinal edge. The second groove extends so as to connect the first longitudinal edge and the second longitudinal edge while intersecting with each of the two first grooves. The second groove is not connected with other grooves than the first grooves in the ground contacting surface.

13 Claims, 4 Drawing Sheets

TIRE

TECHNICAL FIELD

The present invention relates to a tire, and more particularly to a tire for vehicle.

BACKGROUND ART

Patent Document 1 listed below has proposed a tire provided with middle shallow grooves and middle sipes in middle land regions.

PRIOR ART DOCUMENT

Patent Document

[Patent Document 1]
Japanese Unexamined Patent Application Publication No. 2019-116197

SUMMARY OF THE INVENTION

Problems to be Solved by the Invention

In recent years, along with the improvement in performance of vehicles and the development of highway networks, it has become an issue to suppress the hydroplaning phenomenon in which a tire floats from the road surface during running on a wet road. On the other hand, it is necessary to maintain anti-wear performance of the tire.

The present invention was made in view of the above, and a primary object thereof is to provide a tire capable of exerting excellent anti-hydroplaning performance while maintaining the anti-wear performance.

Means for Solving the Problems

The present invention is a tire including a tread portion including a plurality of main grooves extending continuously in a tire circumferential direction and a first land region defined by the main grooves, wherein the first land region includes a first longitudinal edge and a second longitudinal edge, and a ground contacting surface defined between the first longitudinal edge and the second longitudinal edge, the first land region is provided with two first grooves and a second groove, each of the first grooves extends so as to connect the first longitudinal edge and the second longitudinal edge, the second groove extends so as to connect the first longitudinal edge and the second longitudinal edge while intersecting with each of the two first grooves, and the second groove is not connected with other grooves than the first grooves in the ground contacting surface.

In the tire according to the present invention, it is preferred that groove widths of the first grooves and a groove width of the second groove are each 2.0 mm or less.

In the tire according to the present invention, it is preferred that the second groove includes a first portion, a second portion, and a third portion, the first portion is connected with the first longitudinal edge, the second portion is connected with the second longitudinal edge, the third portion is arranged between the first portion and the second portion, and an angle of the third portion with respect to a tire axial direction is larger than an angle of the first portion with respect to the tire axial direction and an angle of the second portion with respect to the tire axial direction.

In the tire according to the present invention, it is preferred that the first portion, the second portion, and the third portion are inclined to the same side with respect to the tire axial direction.

In the tire according to the present invention, it is preferred that each of the first grooves includes a portion inclined to the same side as the first portion, the second portion, and the third portion with respect to the tire axial direction.

In the tire according to the present invention, it is preferred that the angle of the first portion with respect to the tire axial direction and the angle of the second portion with respect to the tire axial direction are each 10 degrees or more and 30 degrees or less.

In the tire according to the present invention, it is preferred that the third portion is inclined at the angle of 65 degrees or more and 85 degrees or less with respect to the tire axial direction.

In the tire according to the present invention, it is preferred that a groove width of the third portion is smaller than each of the groove widths of the first grooves.

In the tire according to the present invention, it is preferred that the groove width of the third portion is in a range of 0.60 to 0.80 times each of the groove widths of the first grooves.

In the tire according to the present invention, it is preferred that a groove width of the third portion is smaller than a groove width of the first portion and a groove width of the second portion.

In the tire according to the present invention, it is preferred that the first land region is provided with a plurality of the second grooves arranged in the tire circumferential direction, the second grooves adjacent to each other overlap in the tire circumferential direction.

In the tire according to the present invention, it is preferred that an overlapping length in the tire circumferential direction of the second grooves is not more than 0.30 times a pitch length in the tire circumferential direction of the second grooves.

In the tire according to the present invention, it is preferred that the tread portion includes a shoulder main groove arranged outside the first land region in a tire axial direction and a second land region adjacent to the first land region with the shoulder main groove therebetween, the second land region is provided with a plurality of third grooves each extending from the shoulder main groove to terminate within the second land region.

In the tire according to the present invention, it is preferred that in a pair of the first groove and its adjacent one of the third grooves in the tire circumferential direction, a distance in the tire circumferential direction between an end, on a side of the shoulder main groove, of the first groove and an end, on a side of the shoulder main groove, of the third groove is not more than 0.20 times a pitch length in the tire circumferential direction of the third grooves.

In the tire according to the present invention, it is preferred that the first groove and the third grooves are inclined to opposite sides to each other with respect to the tire axial direction.

Effects of the Invention

The first land region of the tire of the present invention is provided with two first grooves each extending so as to connect the first longitudinal edge and the second longitudinal edge, and the second groove extending so as to connect the first longitudinal edge and the second longitudinal edge while intersecting with each of the two first grooves. The first grooves and the second groove allow the water film under the first land region to escape from the intersections of the grooves in multiple directions and eventually to be discharged to the main grooves during running on a wet road surface. Thereby, the anti-hydroplaning performance is improved.

Further, the second groove is not connected with any other grooves than the first grooves in the ground contacting surface of the first land region, therefore, rigidity of the first land region is maintained, and as a result, an excessive decrease in the anti-wear performance is suppressed.

MODE FOR CARRYING OUT THE INVENTION

An embodiment of the present invention will now be described in conjunction with accompanying drawings.

Figure 1:
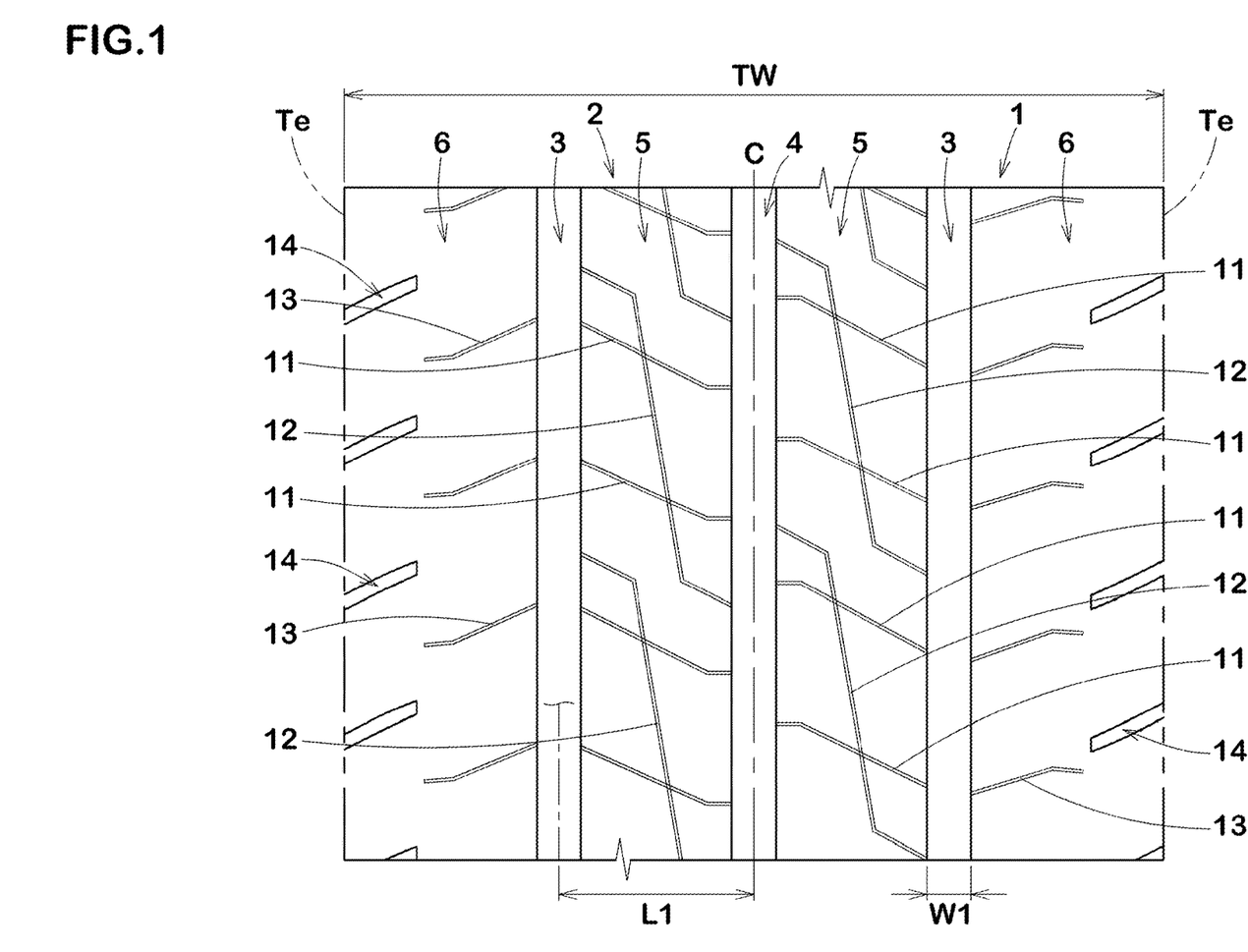
FIG. 1 a development view of a tread portion of a tire according to an embodiment of the present invention.

FIG. 1 is a development view of a tread portion 2 of a tire 1 according to the present embodiment. The tire 1 of the present embodiment can be used for various tires such as a pneumatic tire for passenger cars and for heavy loads, and a non-pneumatic tire in which pressurized air is not filled in the tire, for example. The tire 1 of the present embodiment is suitably used as a pneumatic tire for passenger cars, for example.

As shown in FIG. 1, the tread portion 2 of the tire 1 is provided with a plurality of main grooves extending continuously in a tire circumferential direction. The main grooves of the present embodiment include a pair of shoulder main grooves 3 and a crown main groove 4 arranged between them, for example.

Each of the shoulder main grooves 3 extends linearly in the tire circumferential direction on a side of respective one of tread edges (Te). The shoulder main grooves 3 may extend in a zigzag shape, for example.

In the case of pneumatic tires, "tread edges (Te)" are outermost ground contacting positions in a tire axial direction of the tire 1 when the tire 1 is in a standard state is in contact with a flat surface with zero camber angle by being loaded with a standard tire load. The standard state is a state in which the tire 1 is mounted on a standard rim (not shown), inflated to a standard inner pressure, and loaded with no tire load.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The "standard tire load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

It is preferred that a distance (L1) in the tire axial direction between a tire equator (C) and a groove center line of each of the shoulder main grooves 3 is 0.20 times or more and 0.30 times or less a tread width (TW), for example. The tread width (TW) is a distance in the tire axial direction from one of the tread edges (Te) to the other one of the tread edges (Te) in the standard state.

One crown main groove 4 is provided on the tire equator (C) and extends linearly in the tire circumferential direction, for example. However, the present invention is not limited to such an embodiment, and a pair of the crown main grooves 4 may be provided one by one on both side of the tire equator (C), for example.

It is preferred that each of groove widths (W1) of the main grooves is 4% or more and 7% or less of the tread width (TW), for example. It is preferred that each of groove depths of the main grooves is 5 mm or more and 10 mm or less, for example.

The tread portion 2 includes two first land regions 5 and two second land regions 6 divided by the above-mentioned main grooves provided in the tread portion 2. Thereby, the tread portion 2 of the present embodiment is constituted by so-called four ribs. Each of the first land regions 5 is defined between a respective one of the shoulder main grooves 3 and its adjacent one of the crown main grooves 4, for example. Each of the second land regions 6 is defined axially outside a respective one of the shoulder main grooves 3, for example. In the present embodiment, one first land region 5 and one second land region 6 are provided on each side of the tire equator (C).

Figure 2:
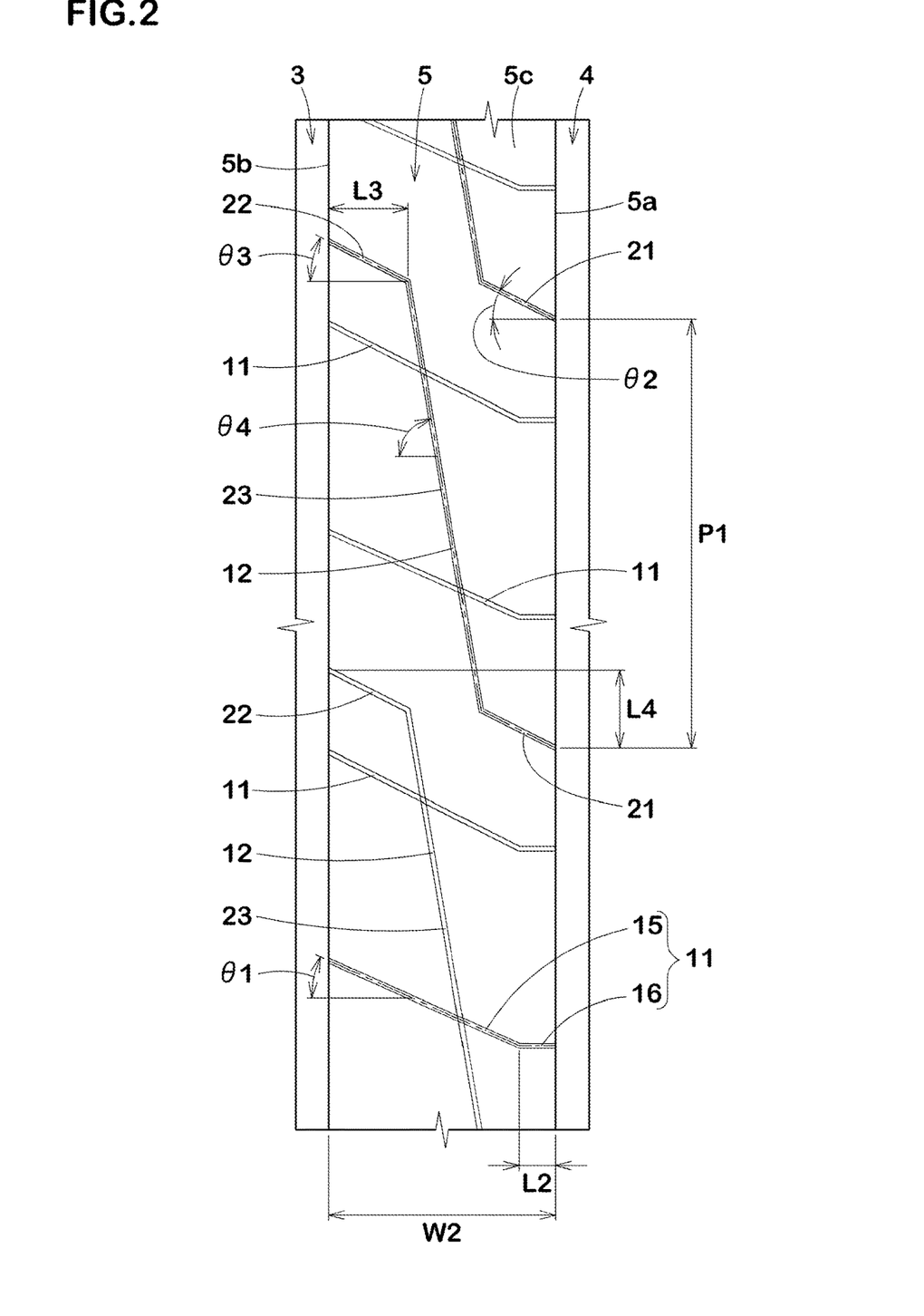
FIG. 2 an enlarged view of a first land region of FIG. 1.

In FIG. 2, an enlarged view of one of the first land regions 5 is shown. As shown in FIG. 2, a width (W2) in the tire axial direction of each of the first land regions 5 is 0.15 times or more and 0.25 times or less the tread width (TW) (shown in FIG. 1 and the same applies hereinafter), for example. However, the present invention is not limited to such an embodiment.

Each of the first land regions 5 includes a first longitudinal edge (5a) and a second longitudinal edge (5b), and a ground contacting surface (5c) defined between the first longitudinal edge (5a) and the second longitudinal edge (5b). In the present embodiment, the first longitudinal edge (5a) is a longitudinal edge positioned on a side of the crown main groove 4, and the second longitudinal edge (5b) is a longitudinal edge positioned on a side of the shoulder main groove 3.

Each of the first land regions 5 includes first grooves 11 and second grooves 12. Pattern units each formed by two first grooves 11 and one second groove 12 are arranged in the tire circumferential direction. In each of the pattern units, each of the first grooves 11 extends so as to connect the first longitudinal edge (5a) and the second longitudinal edge (5b) and the second groove 12 extends so as to connect the first longitudinal edge (5a) and the second longitudinal edge (5b) while intersecting the two first grooves 11. The first grooves 11 and the second grooves 12 allow the water film under the first land regions 5 to escape from the intersections of the grooves in multiple directions and eventually to be discharged to the main grooves during running on a wet road surface. Thereby, the anti-hydroplaning performance is improved.

In the tire of the present invention, the second grooves 12 are not connected with grooves other than the first grooves 11 in the ground contacting surface (5c) of the first land regions 5. More specifically, each of the second grooves 12 has both ends connected with the main groove, and only intersects with the two first grooves 11 and is not connected with any other grooves in the ground contacting surface (5c). Thereby, rigidity of the first land regions 5 is maintained, and as a result, an excessive decrease in the anti-wear performance is suppressed.

Each of groove widths of the first grooves 11 and the second grooves 12 is 3.5 mm or less, and preferably 2.0 mm or less, for example. Further, the first grooves 11 and the second grooves 12 may be configured as so-called sipes in which groove walls thereof contact each other when ground contact pressure is applied to the first land regions 5, for example. The first grooves 11 and the second grooves 12 configured as such are helpful for improving the anti-wear performance.

Each of the first grooves 11 includes a main body portion 15 that is inclined to one side with respect to the tire axial direction, and a parallel portion 16 that extends parallel to the tire axial direction, for example. The main body portion 15 is connected with the shoulder main groove 3, for example, and is inclined at an angle θ1 of 10 degrees or more and 30 degrees or less with respect to the tire axial direction, for example. The main body portion 15 crosses a center position in the tire axial direction of the first land region 5, for example. The main body portions 15 of the first grooves 11 can also provide frictional force in the tire axial direction by edges thereof during running on a wet road surface.

The parallel portion 16 is connected with the crown main groove 4, for example. A length (L2) in the tire axial direction of the parallel portion 16 is 0.10 times or more and 0.20 times or less the width (W2) in the tire axial direction of each of the first land regions 5, for example. The parallel portions 16 configured as such are helpful for suppressing uneven wear starting from end portions of the first grooves 11 on a side of the crown main groove 4.

Each of the second grooves 12 includes a first portion 21, a second portion 22, and a third portion 23, for example. The first portion 21 is connected with the first longitudinal edge (5a). The second portion 22 is connected with the second longitudinal edge (5b). The third portion 23 is arranged between the first portion 21 and the second portion 22. An angle θ4 of the third portion 23 with respect to the tire axial direction is larger than an angle θ2 of the first portion 21 with respect to the tire axial direction and an angle θ3 of the second portion 22 with respect to the tire axial direction. Further, in the present embodiment, the third portion 23 intersects with two first grooves 11. The second grooves 12 configured as such exert frictional force in the tire axial direction by edges of the third portions 23 during running on a wet road surface, therefore, the cornering performance on a wet road surface is improved.

It is preferred that the first portion 21, the second portion 22, and the third portion 23 are inclined to the same side with respect to the tire axial direction. Further, in the present embodiment, the first portion 21, the second portion 22 and the third portion 23 are inclined to the same side as the main body portions 15 of the first grooves 11 with respect to the tire axial direction. In other words, the first grooves 11 include portions that are inclined in the same side as the first portions 21, the second portions 22, and the third portions 23. The second grooves 12 configured as such are helpful for suppressing the uneven wear of the first land regions 5.

Each of the first portion 21 and the second portion 22 is inclined at an angle of 10 degrees or more and 30 degrees or less with respect to the tire axial direction, for example. In a more preferred embodiment, the first portions 21 and the second portions 22 extend parallel to the main body portions 15 of the first grooves 11. Thereby, the uneven wear of the first land regions 5 is suppressed.

Each of the first portions 21 and the second portions 22 is connected with the third portion 23 without reaching the center position in the tire axial direction of the first land regions 5. In the present embodiment, each of the first portions 21 and the second portions 22 is configured to have the same length. It is preferred that a length (L3) in the tire axial direction of each of the first portions 21 or each of the second portions 22 is larger than the length (L2) in the tire axial direction of each of the parallel portions 16 of the first grooves 11, for example. Specifically, the length (L3) is 0.25 times or more and 0.40 times or less the width (W2) in the tire axial direction of each of the first land regions 5.

Each of the third portions 23 crosses the center position in the tire axial direction of a respective one of the first land regions 5, for example. Each of the third portions 23 of the present embodiment intersects with one of the two first grooves 11 at a position on a side of the crown main groove 4 with respect to the center position and intersects with the other first groove 11 at a position on a side of the shoulder main groove 3 with respect to the center position. However, the third portions 23 are not limited to such an embodiment.

The angle θ4 of each of the third portions 23 with respect to the tire axial direction is 45 degrees or more, and preferably 65 degrees or more and 85 degrees or less, for example. In each of the second grooves 12, an angle between the first portion 21 and the third portion 23 and an angle between the second portion 22 and the third portion 23 are each 110 degrees or more and 140 degrees or less, for example. Thereby, during running on a wet road surface, the water in the third portion 23 is easily guided toward the first portion 21 or toward the second portion 22, therefore, excellent wet performance is obtained.

It is preferred that a groove width of each of the third portions 23 is smaller than a groove width of each of the first grooves 11. Specifically, the groove width of each of the third portions 23 is 0.60 times or more and 0.80 times or less the groove width of each of the first grooves 11. The third portions 23 configured as such can maintain the anti-wear performance while improving the wet performance.

In each of the second grooves 12 in the present embodiment, the groove width of the third portion 23 is smaller than a groove width of the first portion 21 and a groove width of the second portion 22. Further, the groove width of the third portion 23 is 0.60 times or more and 0.80 times or less the groove width of the first portion 21 or the groove width of the second portion 22. Thereby, the effects described above are further exerted.

Each of the first land regions 5 is provided with a plurality of the second grooves 12 arranged in the tire circumferential direction. Further, two second grooves 12 adjacent to each other overlap in the tire circumferential direction. An overlapping length (L4) in the tire circumferential direction of the two second grooves 12 is 0.30 times or less one pitch length (P1) in the tire circumferential direction of the second grooves 12. Thereby, excellent anti-hydroplaning performance can be obtained.

In a preferred embodiment, an amount of position gap in the tire circumferential direction between a virtual linear line extending along the first portion 21 of one of the second grooves 12 and a virtual linear line extending along the second portion 22, which is adjacent to the above-mentioned first portion 21, of another second groove 12 is 10 mm or less, and more preferably 5 mm or less.

As shown in FIG. 1, in the present embodiment, regarding the two first land regions 5, the ends, which are connected with the crown main groove 4, of the second grooves 12 arranged in one of the first land regions 5 are misaligned in the tire circumferential direction with the ends, which are connected with the crown main groove 4, of the second grooves 12 arranged in the other first land region 5. The arrangement of the second grooves 12 as described above is helpful for suppressing the uneven wear around the groove edges of the crown main groove 4.

Figure 3:
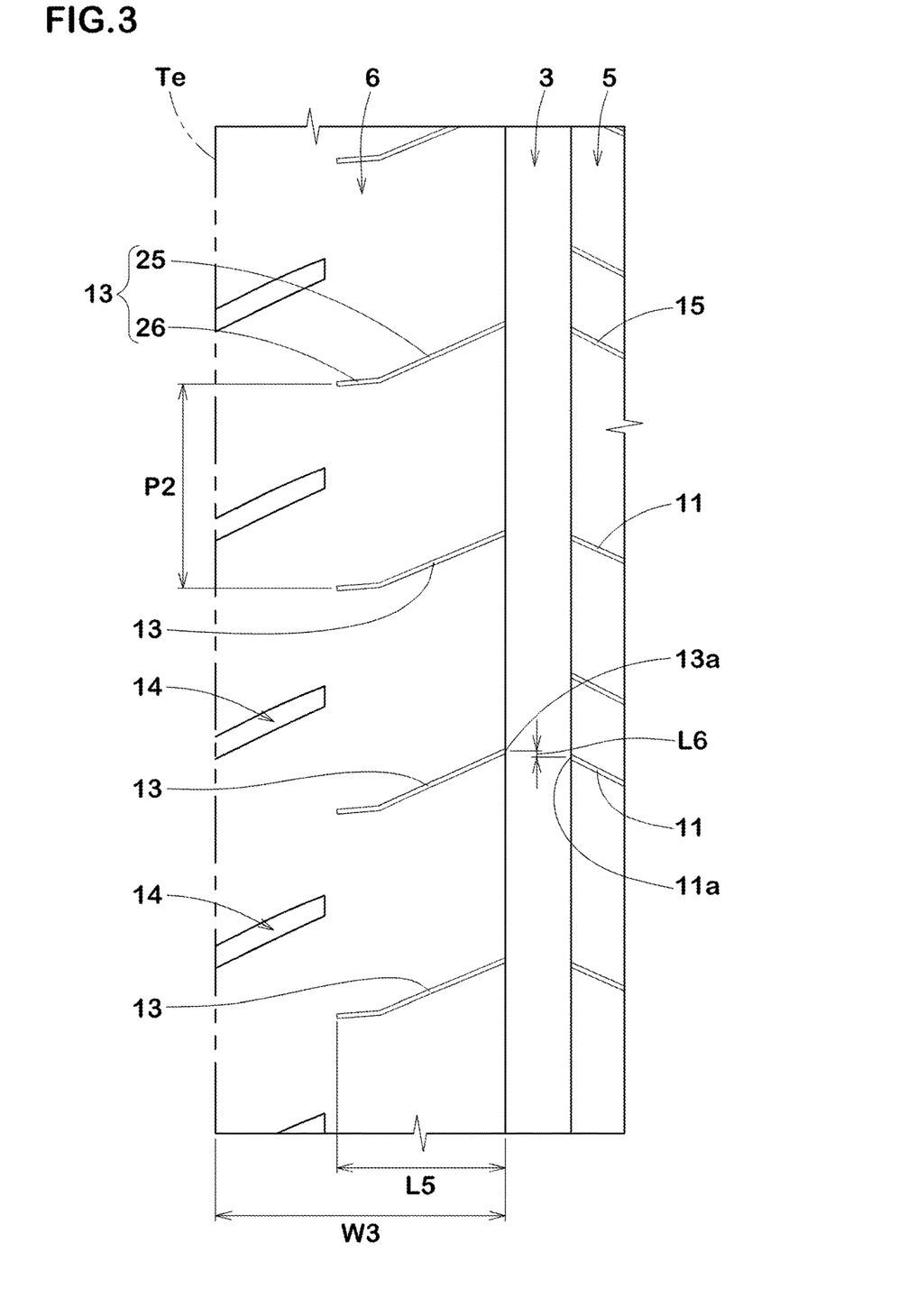
FIG. 3 an enlarged view of a second land region of FIG. 1.

FIG. 3 is an enlarged view of one of the second land regions 6. As shown in FIG. 3, each of the second land regions 6 is adjacent to a respective one of the first land regions 5 with a respective one of the shoulder main grooves 3 between them. A width (W3) in the tire axial direction of each of the second land regions 6 is in a range of 0.20 to 0.30 times the tread width (TW), for example.

Each of the second land regions 6 is provided with a plurality of third grooves 13. In each of the second land regions 6, the third grooves 13 extend from the shoulder main groove 3 to terminate within the second land region 6. Each of groove widths of the third grooves 13 is 3.5 mm or less, and preferably 2.0 mm or less, for example. The third grooves 13 configured as such can improve the wet performance while maintaining the rigidity of the second land regions 6.

Each of the third grooves 13 includes an inclined portion 25 that is inclined with respect to the tire axial direction and an outer end portion 26 that is connected to the inclined portion 25 on an axially outer side thereof, for example. An angle of the inclined portion 25 with respect to the tire axial direction is 10 degrees or more and 30 degrees or less, for example. The outer end portion 26 is arranged at an angle smaller than the inclined portion 25 with respect to the tire axial direction.

It is preferred that the main body portion 15 of the first grooves 11 are inclined to a side opposite to the inclined portions 25 of the third grooves 13. Thereby, the edges of these grooves provide frictional force in multiple directions, therefore, the wet performance is further improved.

It is preferred that each of lengths (L5) in the tire axial direction of the third grooves 13 is smaller than each of axial lengths of the first grooves 11 (shown in FIG. 2). Specifically, each of the lengths (L5) of the third grooves 13 is in a range of 0.50 to 0.65 times the width (W3) in the tire axial direction of each of the second land regions 6. The third grooves 13 configured as such are helpful for improving the anti-wear performance and the wet performance in a good balance.

In each pair of the first groove 11 and the third groove 13 adjacent to each other in the tire axial direction and the tire circumferential direction, it is preferred that a distance (L6) in the tire circumferential direction between an end (11a), which is connected to the shoulder main groove 3, of the first groove 11 and an end (13a), which is connected to the shoulder main groove 3, of the third groove 13 is not more than 0.20 times a pitch length (P2) in the tire circumferential direction of the third grooves 13. Thereby, the first grooves 11 and the third grooves 13 can cooperate with each other to improve the anti-hydroplaning performance.

Each of the second land regions 6 in the present embodiment is provided with a plurality of fourth grooves 14. In each of the second land regions 6, the fourth grooves 14 extend from the tread edge (Te) to terminate within the second land region 6, for example. Each of the fourth grooves 14 has a larger groove width than each of the first grooves 11, the second grooves 12, and the third grooves 13, for example. Each of the groove widths of the fourth grooves 14 is 2.5 mm or more and 4.0 mm or less, for example.

The fourth grooves 14 are inclined to the same side as the third grooves 13 with respect to the tire axial direction, for example. Each of angles of the fourth grooves 14 with respect to the tire axial direction is 10 degrees or more and 30 degrees or less, for example.

While detailed description has been made of the tire according to an embodiment of the present invention, the present invention can be embodied in various forms without being limited to the illustrated embodiment.

Working Examples (Examples)

Figure 4:
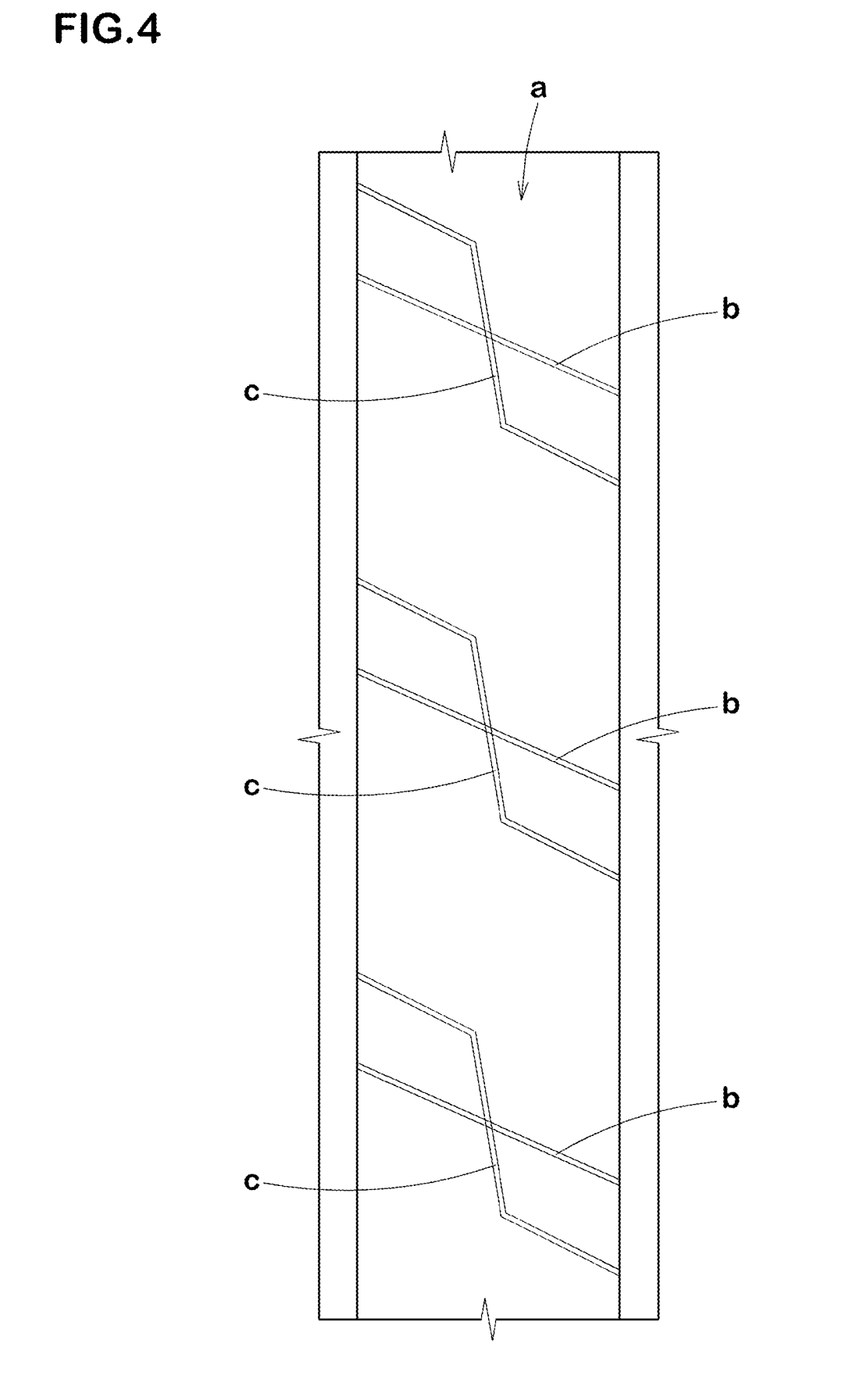
FIG. 4 an enlarged view of the first land region of Reference.

Pneumatic tires of size 195/80R15 having the basic pattern shown in FIG. 1 were made by way of test according to the specifications listed in Table 1. As Reference, as shown in FIG. 4, tires having a first land region (a) provided with a plurality of first grooves (b) and second grooves (c) each of which intersects with one first groove (a) were made by way of test. The tires in the Reference have the same configuration as the tire shown in FIG. 1 except for the configuration of the first land region. Each of the test tires was tested for the wet performance and the anti-wear performance. Common specifications of the test tires and the test methods were as follows.

Tire rim: 15×6.0 J
Tire inner pressure: 340 kPa for front wheels, 425 kPa for rear wheels
Test vehicle: 4WD-car with a displacement of 3000 cc
Tire mounting position: all wheels <Wet Performance>

While the test vehicle was driven on an asphalt road surface having a radius of 100 meters with a paddle having a depth of 10 mm and a length of 20 meters, lateral acceleration (lateral G) of the front wheels was measured. Then an average lateral G at the time when the test vehicle was driven at a speed in a range of 55 to 80 km/h was calculated. The results are indicated by an index based on the value of the Reference being 100, wherein the larger the numerical value, the better the wet performance is.

<Anti-Wear Performance>

Wear energy of the first land regions of each of the test tires was measured by using a wear energy measuring device. The results are indicated by an index based on a reciprocal of the wear energy of the Reference being 100, wherein the larger the numerical value, the smaller the wear energy, which shows better anti-wear performance.

The test results are shown in Table 1.

TABLE 1

|  | Ref | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Figure showing First land region | FIG. 4 | FIG. 2 | FIG. 2 | FIG. 2 | FIG. 2 | FIG. 2 | FIG. 2 | FIG. 2 | FIG. 2 | FIG. 2 |
| Angle θ4 of Third portion of Second groove [degree] | 80 | 80 | 65 | 70 | 75 | 85 | 80 | 80 | 80 | 80 |

TABLE 1-continued

|  | Ref | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Groove width of Third portion of Second groove/Groove width of First groove | 0.70 | 0.70 | 0.70 | 0.70 | 0.70 | 0.70 | 0.60 | 0.65 | 0.75 | 0.80 |
| Wet performance [index] | 100 | 106 | 104 | 105 | 106 | 105 | 104 | 105 | 106 | 106 |
| Anti-wear performance [index] | 100 | 100 | 101 | 100 | 100 | 99 | 101 | 100 | 100 | 99 |

From the test results, it was confirmed that the tires in Examples exerted excellent wet performance. Further, it was confirmed that the tires in the Examples maintained the anti-wear performance.

DESCRIPTION OF REFERENCE SIGNS 2 tread portion
5 first land region
5a first longitudinal edge
5b second longitudinal edge
5c ground contacting surface
11 first groove
12 second groove

The invention claimed is:

1. A tire comprising a tread portion including:
a plurality of main grooves extending continuously in a tire circumferential direction and a first land region defined by the main grooves, wherein
the first land region includes a first longitudinal edge and a second longitudinal edge, and a ground contacting surface defined between the first longitudinal edge and the second longitudinal edge,
the first land region is provided with two first grooves and a second groove,
each of the first grooves extends so as to connect the first longitudinal edge and the second longitudinal edge,
the second groove extends so as to connect the first longitudinal edge and the second longitudinal edge while intersecting with each of the two first grooves,
the second groove is not connected with other grooves than the first grooves in the ground contacting surface,
the tread portion includes a shoulder main groove arranged outside the first land region in a tire axial direction and a second land region adjacent to the first land region with the shoulder main groove therebetween,
the second land region is provided with a plurality of third grooves each extending from the shoulder main groove to terminate within the second land region, and
in a pair of the first groove and its adjacent one of the third grooves in the tire circumferential direction, a distance in the tire circumferential direction between an end, on a side of the shoulder main groove, of the first groove and an end, on a side of the shoulder main groove, of the third groove is not more than 0.20 times a pitch length in the tire circumferential direction of the third grooves.

2. A tire comprising a tread portion including
a plurality of main grooves extending continuously in a tire circumferential direction and a first land region defined by the main grooves, wherein
the first land region includes a first longitudinal edge and a second longitudinal edge, and a ground contacting surface defined between the first longitudinal edge and the second longitudinal edge,
the first land region is provided with a plurality of first grooves arranged in the tire circumferential direction and a plurality of second grooves arranged in the tire circumferential direction,
each of the first grooves extends so as to connect the first longitudinal edge and the second longitudinal edge,
each of the second grooves extends so as to connect the first longitudinal edge and the second longitudinal edge while intersecting with two of the first grooves,
each of the second grooves is not connected with other grooves than the two of the first grooves in the ground contacting surface,
the second grooves adjacent to each other overlap in the tire circumferential direction,
an overlapping length in the tire circumferential direction of the second grooves is not more than 0.30 times a pitch length in the tire circumferential direction of the second grooves,
each of the second grooves includes a first portion, a second portion, and a third portion,
the first portion is connected with the first longitudinal edge,
the second portion is connected with the second longitudinal edge,
the third portion is arranged between the first portion and the second portion,
an angle of the third portion with respect to a tire axial direction is larger than an angle of the first portion with respect to the tire axial direction and an angle of the second portion with respect to the tire axial direction,
the third portion is inclined at the angle of 65 degrees or more and 80 degrees or less with respect to a tire axial direction,
the third portion has a groove width in a range of 0.60 to 0.75 times each of groove widths of the first grooves,
each of the first grooves includes a main body portion inclined to one side with respect to the tire axial direction and a parallel portion extending parallel to the tire axial direction, and
the parallel portion is connected with one of the main grooves and has a length in the tire axial direction of 0.10 times or more and 0.20 times or less a width in the tire axial direction of the first land region.

3. The tire according to claim 2, wherein
groove widths of the first grooves and a groove width of the second groove are each 2.0 mm or less.

4. The tire according to claim 2, wherein
the angle of the first portion with respect to the tire axial direction and the angle of the second portion with respect to the tire axial direction are each 10 degrees or more and 30 degrees or less.

5. The tire according to claim 2, wherein
a groove width of the third portion is smaller than a groove width of the first portion and a groove width of the second portion.

6. The tire according to claim 2, wherein
the first portion and the second portion extend parallel to the main body portion.

7. The tire according to claim 2, wherein the first portion, the second portion, and the third portion are inclined to the same side with respect to the tire axial direction.

8. The tire according to claim 7, wherein each of the first grooves includes a portion inclined to the same side as the first portion, the second portion, and the third portion with respect to the tire axial direction.

9. The tire according to claim 2, wherein the third portion intersects with the two first grooves.

10. The tire according to claim 9, wherein the third portion crosses a center position in the tire axial direction of the first land region, and the third portion intersects with one of the two first grooves at a position on a side of the first longitudinal edge with respect to the center position and intersects with the other first groove at a position on a side of the second longitudinal edge with respect to the center position.

11. The tire according to claim 2, wherein the tread portion includes a shoulder main groove arranged outside the first land region in a tire axial direction and a second land region adjacent to the first land region with the shoulder main groove therebetween, and the second land region is provided with a plurality of third grooves each extending from the shoulder main groove to terminate within the second land region.

12. The tire according to claim 11, wherein the first groove and the third grooves are inclined to opposite sides to each other with respect to the tire axial direction.

13. The tire according to claim 11, wherein each of the third grooves includes an inclined portion inclined with respect to the tire axial direction and an outer end portion connected to the inclined portion on an axially outer side thereof, and the outer end portion is arranged at an angle smaller than the inclined portion with respect to the tire axial direction.

* * * * *